Patented Aug. 14, 1951

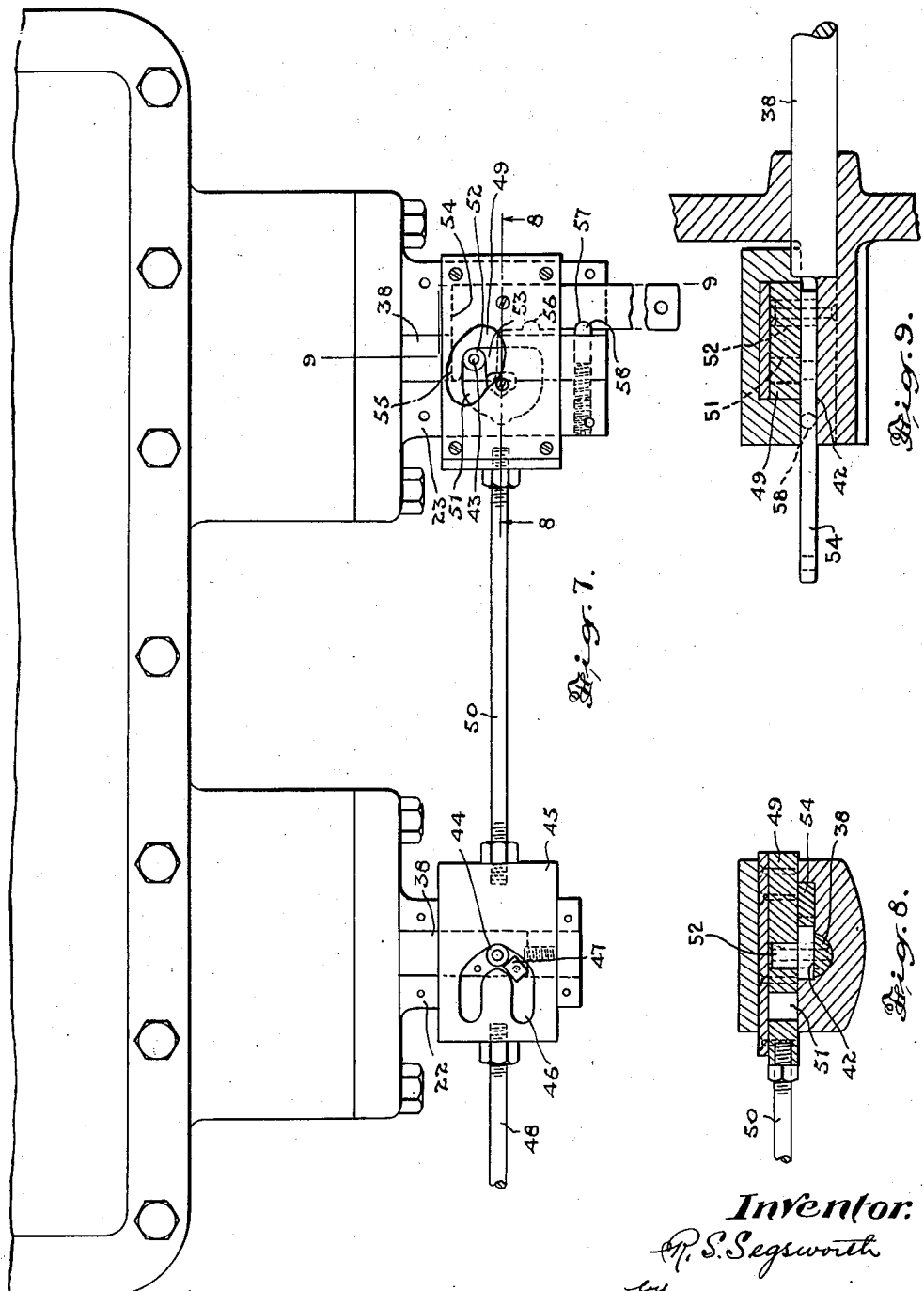

2,564,237

UNITED STATES PATENT OFFICE 2,564,237

VARIABLE SPEED ROTARY PUMP AND MOTOR HYDRAULIC TRANSMISSION

Robert S. Segsworth, Toronto, Ontario, Canada, assignor to The General Engineering Company (Canada) Limited, Toronto, Ontario, Canada Application June 11, 1945, Serial No. 598,862

2 Claims. (Cl. 60—53)

This invention relates to hydraulic transmissions of the type in which a fluid medium is displaced at variable speeds by a vane type rotor operating within a cylinder adjustable relative to the axis of the rotor and is utilized to drive a similar rotor also having a variable axial relation to an enclosing cylinder and the principal object of the invention is to devise a structure which will permit of a wide range of adjustment in both the driving and driven members.

A further object is to provide a device in which the adjustment of the cylinders enclosing the rotors to effect variation in speed is effected by fluid operated servo-motors.

The principal feature of the invention consists in the novel arrangement of a pair of rotors within a fluid-tight casing with cylinders individually enclosing said rotors being mounted within said casing and being separately operable to alter their axial positions relative to the rotors enclosed thereby.

A further feature of importance consists in the novel arrangement of fluid operated servo-motors for adjusting the rotor enclosing cylinders and the means for effecting the co-operative control of said servo-motors.

In the accompanying drawings—

Figure 7 is a plan view of a portion of the machine showing the servo-motors for operating the driving and driven rotors and the means for controlling same.

Figure 8 is a vertical sectional view taken on the line 8—8 of Figure 7.

Figure 9 is a vertical sectional view taken on the line 9—9 of Figure 7.

Figure 1:
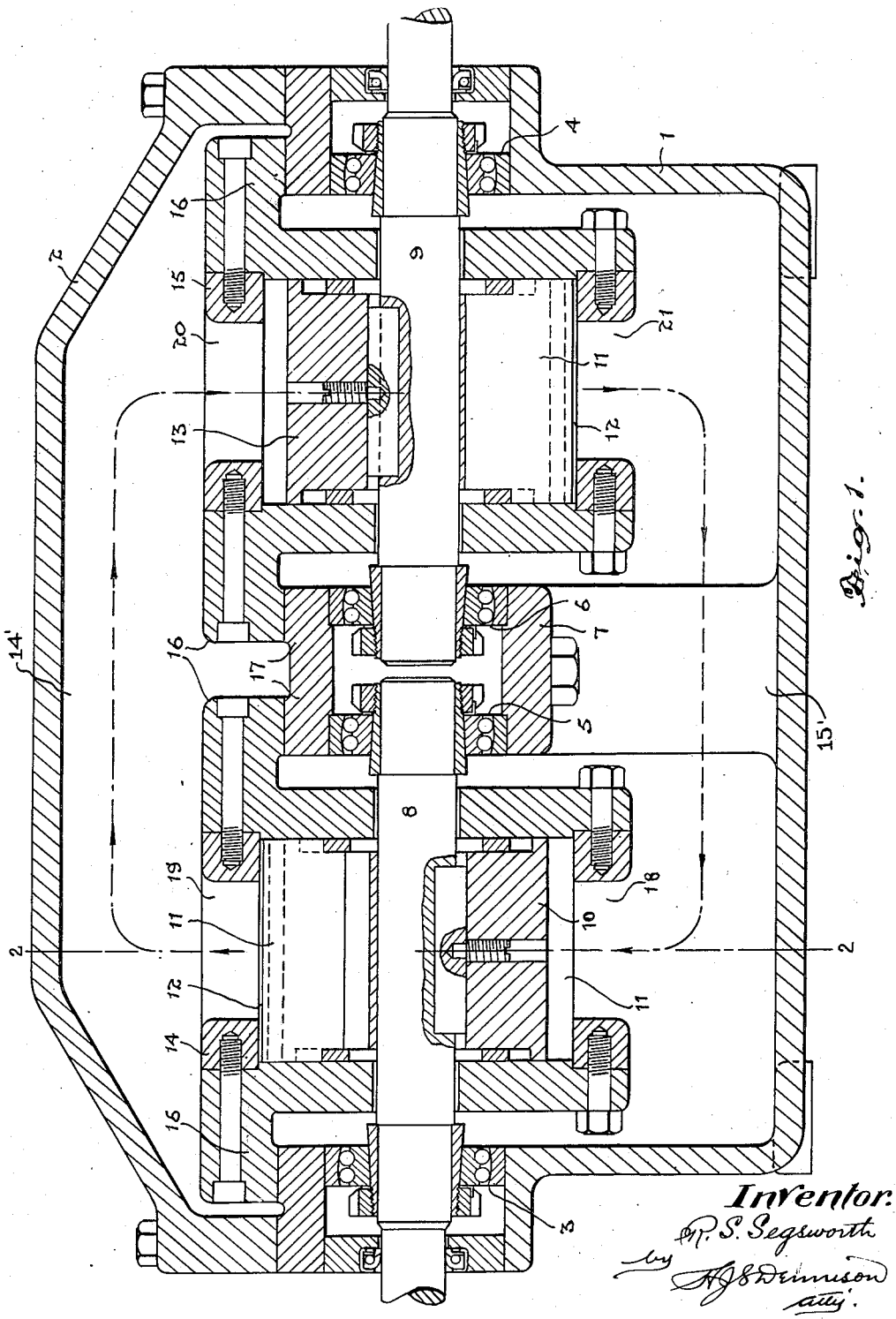
Figure 1 is a vertical longitudinal mid-sectional view of a fluid transmission constructed in accordance with this invention.

In the form of the invention herein illustrated a casing 1 provided with a sealed cover 2 is formed with end journal bearings 3 and 4 and aligned central journal bearings 5 and 6 mounted in a cross member 7.

Mounted in the journal bearings 3 and 5 is the driving shaft 8, the outer end of which will be connected to a suitable prime mover such as an engine or electric motor.

Mounted in the journal bearings 4 and 6 is a driven shaft 9, at the outer end of which is connected the mechanism to be driven.

Rigidly secured on the shaft 8 between its journal bearings in a radially slotted rotor 10 carrying a plurality of radial vanes 11 each of which is provided with a contact shoe 12 rockably mounted therein.

Figure 2:
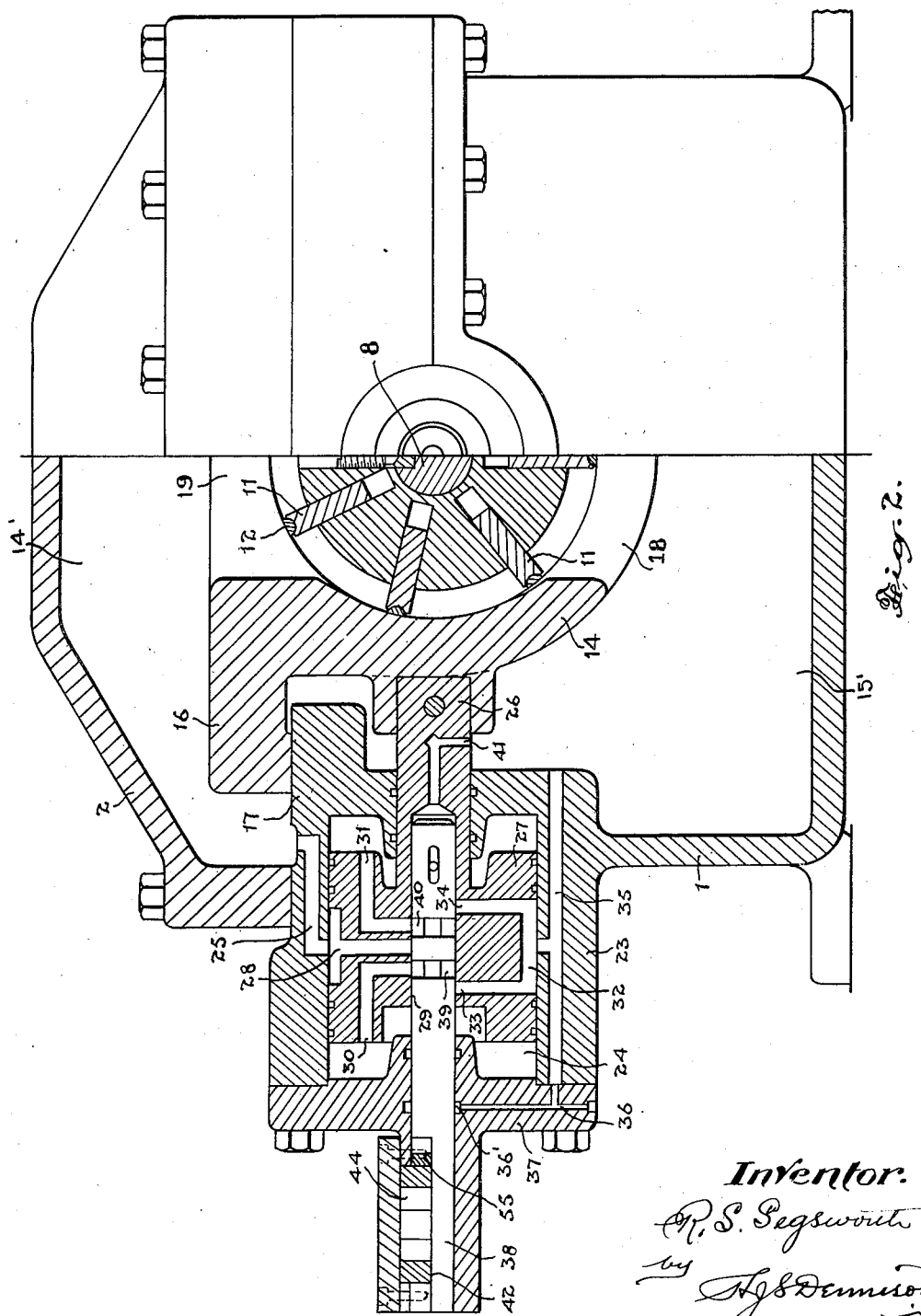
Figure 2 is a half end elevation and half vertical cross section through the machine taken on the line 2—2 of Figure 1.

A similar rotor 13 is mounted on the shaft 9. Cylinders 14 and 15 enclose the rotors 10 and 13 each having lateral extensions 16 slidably mounted on horizonal guideways 17 extending transversely within the casing 1. These cylinders 14 and 15 and their extensions 16 define with the casing 1 and cover 2 and guideway 17 separated high and low pressure passages 14' and 15' respectively within the casing as will be seen from Figures 1 and 2.

The cylinder 14 enclosing the rotor on the driving shaft 8 is formed with an intake port 18 at the bottom and a discharge port 19 at the top and the cylinder 15 is formed with an intake port 20 at the top and a discharge port 21 at the bottom.

The radial vanes of each rotor are preferably supported in their extended positions with the contact shoes 12 engaging the cylinder surfaces.

The casing 1 is formed with cylindrical hub extensions 22 and 23 having their axes arranged in the horizontal plane of and at right angles to the axis of the shafts 8 and 9 and within each hub is a cylinder chamber 24 which has a port 25 arranged centrally of the length thereof and which communicates with the high pressure passage 14' of the interior of the casing 1 to conduct pressure fluid.

A piston rod 26 is connected to each of the rotor cylinders 14 and 15 which extends through a suitably packed bearing in the inner end of the cylinder 24 and has mounted thereon within said cylinder 24 a piston 27. The piston 27 has formed in its upper side midway of its length a T-shaped port 28 which extends inwardly to a longitudinal axial bore 29. Reverse L-shaped ports 30 and 31 are arranged either side of the central portion of the T-shaped port 28 and lead outwardly from the central bore 29 to the opposite ends of the piston.

A U-shaped port 32 is arranged in the lower side of the piston, the separated inner ends 33 and 34 being spaced apart a distance wider than the inward ends of the L-ports 30 and 31 and leading from the bore 29 outwardly to a central exhaust port 35 in the cylinder wall which leads to both ends of the cylinder casing, communicating at the inner end with the low pressure passage 15′ of the interior of the casing 1 and at the other end with an oil duct 36 which encircles the bore 36′ of the cylinder head 37.

A piston valve 38 is slidably mounted in the bore 36′ of the cylinder head and extends into the bore 29 of the piston 27 and is formed with spaced annular ports 39 and 40 which normally communicate with the inner ends of the L-ports 30 and 31 and which lie between the inner ends 33 and 34 of the U-port 32.

An escape port 41 extends from the inner end of the bore 29 to the low pressure passage 15′ of the interior of the casing 1.

The outward end of the piston rod 38 is formed with a flattened upper face 42 and extending upwardly therefrom is a pin 43 carrying a roller 44.

Slidably mounted on the bearing member supporting the piston rod 38 which actuates driving unit cylinder 14 is a plate 45 which is formed with a U-shaped slot 46 into which the roller 44 extends.

A block 47 is removably secured in one leg of the U-slot 46 to prevent the roller moving into that leg when the plate is moved transversely to the piston rod.

The plate 45 is operated by a control rod 48 which may be operated manually or by a suitable governor and when moved transversely by pushing on the rod 48 the roller 44 is forced by the inclined surface of the slot, thereby moving the piston valve 38 inwardly.

The inward movement of the valve 38 opens communication between the fluid pressure containing port 28 and the port 30, thereby directing pressure fluid to the outward end of the piston 27 and moving it inwardly to alter the position of the cylinder 14 relative to the rotor 10. The inward movement of the piston 27 shifts the port 28 relative to the ports 39 and 40 in the piston valve 38 so that the port 28 is again closed and movement of the piston ceases and it is held in the assumed position until the ported piston valve 38 is again moved.

The piston control plate 45 of the driving unit cylinder 14 is connected with a similar slidable plate 49 of the driven unit cylinder 15 by a rod 50.

The plate 49 is formed with a D-shaped slot 51 which is in a reverse position to the U-slot 46 in the plate 45 and the roller 52 operating the piston valve of the driven unit cylinder actuator is in the full inward position when the roller 44 is in the central position.

It will be seen that, due to the relative arrangement of the U and D-slots in the plates 45 and 49 the movement of the control bar first moves the piston valve and the cylinder 14 of the driving unit from the mid-position to the extreme inward position while the piston valve and the cylinder 15 of the driven unit are held in the extreme position by the position of the roller 52 in the leg of the slot 51. Continued movement of the control rod then moves the bevelled end of the D-slot 51 to move the roller and piston valve of the driven unit from the extreme position to the mid-position.

Figure 3:
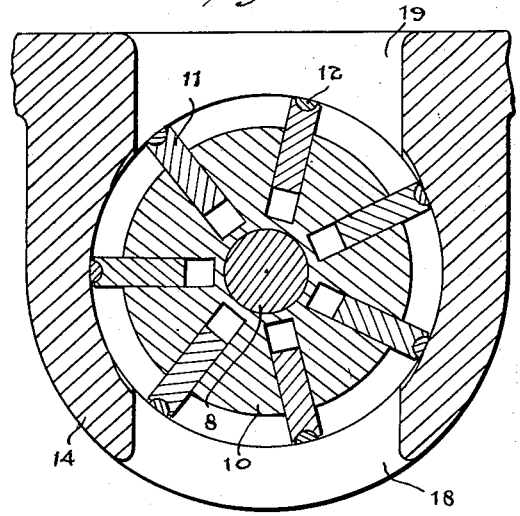
Figure 3 is a vertical cross sectional view through the driving rotor and its enclosing cylinder with the cylinder and rotor arranged co-axially in the neutral or non-driving position.
Figure 4:
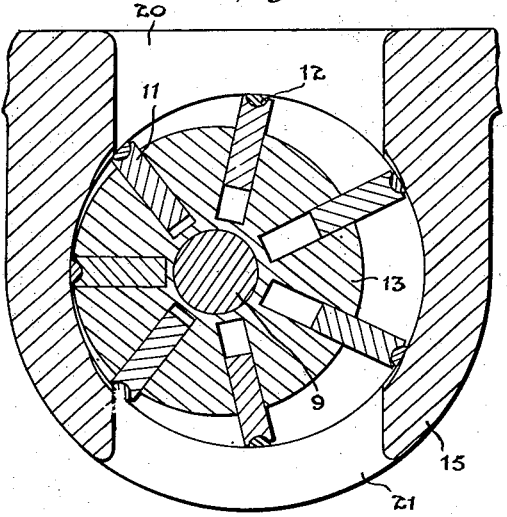
Figure 4 is a vertical cross sectional view through the driven rotor and its enclosing cylinder in the eccentric position relative to the driving member when said driving member is in the neutral position.
Figure 5:
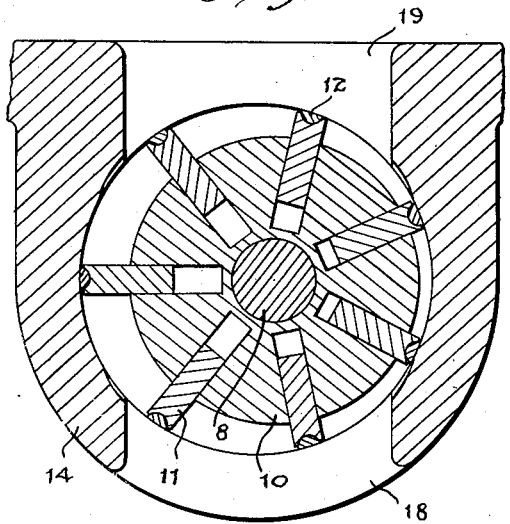
Figure 5 is a view similar to Figure 3 illustrating the relative eccentric relation of the cylinder and rotor in a driving position.
Figure 6:
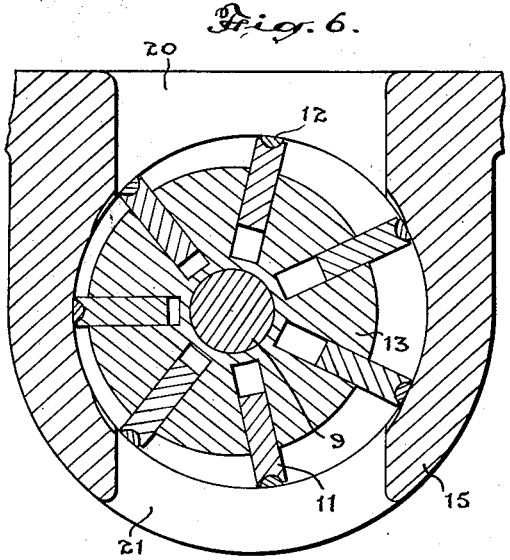
Figure 6 is a view similar to Figure 4 illustrating the relative position of the cylinder and rotor being driven.

Therefore when the cylinder 14 is in the neutral position relative to its rotor 10 when no oil is being pumped, as shown in Figure 3, the cylinder 15 is in the extreme position relative to its rotor 13, requiring as shown in Figure 4 the maximum amount of oil per revolution and no motion is being transmitted to the driven shaft. When the piston valve 38 of the driving member is moved inward the cylinder 14 is shifted to a position as shown in Figure 5, gradually increasing the amount of oil pumped per revolution, building up the speed of the driven member. owing to the arrangement of the valve mechanism described when cylinder 14 reaches its extreme position the roller 52 on piston valve 38 will begin to engage the tapered portion of the U-slot 51 which as described above causes the cylinder 15 to be moved from its extreme position, thereby reducing the oil required per revolution as shown in Figure 6 and so further increasing the output speed.

At the mid-travel position of the control bar 48 the driving unit will be delivering a maximum quantity of oil per revolution through its discharge port and the driven member will have the maximum quantity of oil flowing through its intake port.

If the two cylinder units are of equal capacity the driven speed will equal the driving speed but if they are of unequal size, the speed ratio will be inversely proportioned to the relative size.

Movement of the control bar past the point of mid-travel will gradually reduce the amount of oil required per revolution by the driven rotor and the speed of the driven member will be gradually increased.

Provision is made for reversing the direction of rotation of the driven member. The slot 51 is continued across the spaced ends by a passage 53 and slidably mounted adjacent thereto is a plate 54 formed with a forked end 55 which engages the roller pin 52 which may be moved to shift the roller to the opposite or outer branch of the U-slot 51, thereby reversing the position of the piston valve relative to the servo-motor piston for operating the cylinder 15.

The plate 54 is provided with edge notches 56 and 57 which are engaged by a spring bolt 58 to hold the reversing plate in the adjusted positions.

Reversal of the direction of pumping of the driving rotor 10 may be effected by shifting the block 47 located in the U-slot 46 to the opposite fork to that shown, thereby changing the direction of discharge flow in the driving member.

It will be appreciated that the control rod 48 and the controlling piston valves operated thereby may be moved with very little effort so that this mechanism may readily be operated by a simple form of governor or similar device.

A fluid transmission such as described is extremely flexible in its operation. It enables the transmission of speed from the driving to the driven member at varying speeds in a smooth uninterrupted flow and the direction of movement can be instantly changed, the accelerated speed being automatically braked by the fluid medium.

The structure of the device is simple and rugged and there are no delicate parts liable to get out of order. Further, as the device operates with oil as the fluid medium all parts will be effectively lubricated.

It will be understood that while a special form of servo-motor for controlling the cylinders relative to their rotors has been described other forms of control devices may be used effectively.

What I claim as my invention is:

1. In a hydraulic power transmission the combination with a closed casing, a pair of independently operable shafts journalled longitudinally of said casing and having rotors thereon, and cylinders enclosing said rotors and defining with said casing separated passages leading between said cylinders, each of said cylinders having an inlet port communicating with one of said passages and a discharge port communicating with the other of said passages, of cylinders formed in said casing each having intermediate its length an intake port communication with one of said passages and a discharge port communicating with the other of said passages, a piston operating in each of said casing cylinders and operatively connected with one of said rotor cylinders to move same tranversely in said casing, said pistons each having a central bore and a port arranged centrally of its length communicating with the intake port of the cylinder in which it operates and ports arranged each side of said central port leading to the piston ends and a discharge port arrangement communicating with the discharge port of the cylinder in which it operates, a piston valve operable in the central bore of each of said pistons and having ports co-operating with said central and end piston ports, the end of each of said piston valves extending beyond its casing cylinder and being provided with a pin extension having a roller mounted thereon, a plate mounted to slide transversely of one of said piston valves having a curved slot therein engaging the roller on the valve pin to first operate the valve in a predetermined direction and then hold it from further movement, a plate mounted to slide transversely of the other of said piston valves and connected to operate with the aforesaid plate and having a slot therein adapted to permit the first movement of the second plate without movement of its valve and to then move the second valve while the first valve is stationary.

2. In a hydraulic power transmission the combination with a closed casing, a pair of independently operable shafts journalled longitudinally of said casing having rotors thereon, and cylinders enclosing said rotors and defining with said casing separated passages leading between said cylinders, each of said cylinders having an inlet port communicating with one of said passages and a discharge port communicating with one of said passages, of cylinders formed in said casing each having intermediate its length an intake port communication with one of said passages and a discharge port communicating with the other of said passages, a piston operating in each of said casing cylinders and operatively connected with one of said rotor cylinders to move same transversely in said casing, said pistons each having a central bore and a port arranged centrally of its length communicating with the intake port of the cylinder in which it operates and ports arranged each side of said central port leading to the piston ends and a discharge port arrangement communicating with the discharge port of the cylinder in which it operates, a piston valve operable in the central bore of each of said pistons and having ports co-operating with said central and end piston ports, the end of each of said piston valves extending beyond its casing cylinder and being provided with a pin extension, a plate mounted to slide transversely of one of said piston valves having a U-shaped slot engaging the valve pin, a plate mounted to slide transversely of the other of said piston valves having a D-shaped slot therein engaging the pin of said latter valve, and means for shifting said latter valve to move its pin into a different relation to the D-shaped slot to effect a reverse movement of the mechanism controlled by said latter valve.

ROBERT S. SEGSWORTH.

REFERENCES CITED

The following references are of record in the file of this patent:

UNITED STATES PATENTS

| Number | Name | Date |
|---|---|---|
| 466,660 | Duncan | Jan. 5, 1892 |
| 1,656,544 | Thoma | Jan. 17, 1928 |
| 1,762,532 | Sorensen | June 10, 1930 |
| 1,840,869 | Rayburn | Jan. 12, 1932 |
| 2,211,402 | Benedek | Aug. 13, 1940 |
| 2,255,963 | Benedek | Sept. 16, 1941 |
| 2,309,148 | Wilson | Jan. 26, 1943 |
| 2,384,218 | Tucker | Sept. 4, 1945 |
| 2,492,720 | Tyler | Dec. 27, 1949 |

FOREIGN PATENTS

| Number | Country | Date |
|---|---|---|
| 222,647 | Great Britain | Oct. 9, 1924 |
| 426,861 | Great Britain | Apr. 10, 1935 |
| 519,686 | Germany | Mar. 3, 1931 |